United States Patent
Priebatsch et al.

(10) Patent No.: US 11,587,057 B2
(45) Date of Patent: Feb. 21, 2023

(54) DISTRIBUTED AUTHENTICITY VERIFICATION FOR CONSUMER PAYMENT TRANSACTIONS

(71) Applicant: SCVNGR, INC., Boston, MA (US)

(72) Inventors: Seth Priebatsch, Boston, MA (US); Charles Carter Jernigan, Cambridge, MA (US)

(73) Assignee: SCVNGR, INC., Boston, MA (US)

( * ) Notice: Subject to any disclaimer, the term of this patent is extended or adjusted under 35 U.S.C. 154(b) by 552 days.

(21) Appl. No.: 16/424,281

(22) Filed: May 28, 2019

(65) Prior Publication Data

US 2020/0151698 A1    May 14, 2020

Related U.S. Application Data

(63) Continuation of application No. 13/797,287, filed on Mar. 12, 2013, now abandoned.

(51) Int. Cl.
*G06Q 20/32*   (2012.01)
*G06Q 20/38*   (2012.01)
*G06Q 20/40*   (2012.01)

(52) U.S. Cl.
CPC ......... *G06Q 20/322* (2013.01); *G06Q 20/385* (2013.01); *G06Q 20/38215* (2013.01); *G06Q 20/40* (2013.01)

(58) Field of Classification Search
CPC .......... G06Q 20/322; G06Q 20/38215; G06Q 20/385; G06Q 20/40
See application file for complete search history.

(56) References Cited

U.S. PATENT DOCUMENTS

| 4,680,757 | A * | 7/1987 | Murakami | H04L 12/433 |
| | | | | 370/455 |
| 6,000,832 | A * | 12/1999 | Franklin | G06Q 20/02 |
| | | | | 235/379 |
| 8,694,438 | B1 * | 4/2014 | Jernigan | G06Q 20/3274 |
| | | | | 705/67 |
| 2003/0028481 | A1 * | 2/2003 | Flitcroft | G07F 19/00 |
| | | | | 705/39 |
| 2003/0200212 | A1 * | 10/2003 | Benson | G06F 16/252 |
| 2004/0073621 | A1 * | 4/2004 | Sampson | G06Q 20/12 |
| | | | | 709/209 |
| 2010/0125509 | A1 * | 5/2010 | Kranzley | G06Q 40/00 |
| | | | | 705/17 |

(Continued)

FOREIGN PATENT DOCUMENTS

WO    WO-0177851 A1 *  10/2001  ............. H04L 69/16

OTHER PUBLICATIONS

Li, et al., "A distributed authentication and authorization scheme for in-network big data sharing," Digital Comm. And Networks 3 (2017):226-235, 10 pages.

*Primary Examiner* — Patrick McAtee
*Assistant Examiner* — Vincent I Idiake
(74) *Attorney, Agent, or Firm* — Baker Botts L.L.P.

(57) ABSTRACT

Payment tokens designed for display on a consumer's mobile device include dynamic trust data (e.g., transaction history and/or token generation date) along with financial account information, enabling merchants to make an informed decision about whether to accept payment without communication with the central processing system, and also protecting the consumer's account information from theft.

25 Claims, 8 Drawing Sheets

(56) References Cited

U.S. PATENT DOCUMENTS

| | | | |
|---|---|---|---|
| 2010/0192210 A1* | 7/2010 | Purdy, Sr. | G06Q 20/1235 726/7 |
| 2010/0293094 A1* | 11/2010 | Kolkowitz | G06Q 20/40 705/44 |
| 2011/0071986 A1* | 3/2011 | Schmidt | G06F 16/217 707/684 |
| 2011/0137789 A1* | 6/2011 | Kortina | G06Q 40/025 705/38 |
| 2011/0161233 A1* | 6/2011 | Tieken | G06Q 20/4014 705/71 |
| 2012/0158589 A1* | 6/2012 | Katzin | G06Q 20/384 705/44 |
| 2013/0054336 A1* | 2/2013 | Graylin | G06Q 40/02 705/14.26 |
| 2013/0317923 A1* | 11/2013 | Capps | G06Q 20/12 705/16 |
| 2014/0025585 A1* | 1/2014 | Calman | G06Q 20/38215 705/76 |
| 2014/0250006 A1* | 9/2014 | Makhotin | G06Q 20/326 705/41 |

\* cited by examiner

DISTRIBUTED AUTHENTICITY VERIFICATION FOR CONSUMER PAYMENT TRANSACTIONS

BACKGROUND

It is common practice for consumers to pay a merchant electronically for goods or services received. Electronic payments are typically made with a token that identifies a source of funding. For example, a credit card containing a magnetic strip is a token. Payment tokens usually contain static information, such as an account number, identifying a source of payment. When a credit card is swiped, the card number is transmitted to a centralized payment processing system. Before authorizing payment, the centralized payment processing system may verify whether the account exists and is active, whether the account can fund the transaction, or whether the transaction may be fraudulent. A physical token such as a credit card cannot be easily modified and, in the event that it is lost or stolen, the consumer must report the lost card and wait for a replacement to be mailed. As a result, systems that allow a consumer to pay for a transaction at the point of sale (POS), using a mobile device to display a token (usually in the form of a barcode or QR code), are becoming widely accepted. Similar to credit-card tokens, mobile device tokens typically contain static information that must be transmitted to a centralized payment processing system for authentication and payment authorization.

If the centralized payment-processing system or the merchant system loses network access (e.g., a network problem, a system power outage, a system fire, a system bug, or the like), however, the token cannot be used for payment without significant risk of fraud. Some merchants may copy (e.g., take a credit-card imprint) or otherwise save the consumer's account information or token, deliver goods to the consumer, and attempt to process the payment at a later time when the network is restored. But if the token is a fraud, the merchant will not get paid. In addition, the mere act of copying account information creates a risk of theft for the owner of the token.

Accordingly, a system that protects both the consumer and the merchant from the risk of fraud regardless of network availability is needed.

SUMMARY

The present invention addresses these problems by encrypting a payment token for display on a consumer's mobile device with dynamic trust data (e.g., transaction history and/or token generation date) along with the financial account information. This approach not only enables the merchant system to make an informed decision about whether to accept payment without communication with the central processing system, but also protects the consumer's account information from theft.

Accordingly, in one aspect, the invention pertains to a method of processing a transaction among a consumer, a merchant point-of-sale system and a transaction-processing entity. In representative embodiments, the method includes generating a token encrypted with data identifying a financial account of the consumer and trust data for the consumer; receiving and storing the token by a device of the consumer; reading and decrypting, by the merchant system, the token upon presentation thereof by the consumer's device in connection with the transaction; authorizing, by the merchant system, the transaction based on (i) successful decryption of the token and (ii) the trust level without communication with the transaction-processing entity; subsequent to authorization of the transaction by the merchant system, communicating, by the merchant to the transaction-processing entity, a record of the transaction and authorization thereof; and following the communication from the merchant system to the transaction-processing entity, completing the authorized transaction by causing funds to be transferred from the consumer's financial account to the merchant. The authorized transaction may be completed upon approval by the transaction-processing entity of a basis for the authorization by the merchant system. Additionally, the approval by the merchant system may also be based on a time of generation of the token and a time of the reading.

In various embodiments, the trust data contains at least a token generation time, a transaction history of the consumer, a spending limit of the consumer or, a home region of the consumer. The trust data may be a single trust-factor value. The token may be encrypted using public key cryptography. As an alternative to encryption, the token may be signed with a digital signature. The token may be displayed as a "Quick Response" (QR) code on the consumer device, and may be a one-time-use token.

In various embodiments, the method may additionally include generating and storing, on the consumer device, a plurality of tokens. Following a triggering event, such as expiration of a pre-set time period or presentation of the token, a first token may be marked for deletion and a second token may be marked for display on a subsequent presentation. The presentation of the first token may comprise receiving confirmation from the merchant system that the token was received. Additionally, the method may include generating a token to replace the token marked for deletion. In various embodiments, the token may not be marked for deletion until a deletion communication is received from the transaction-processing entity. Alternatively, following presentation of a first token, the first token may be marked for deletion and a second token is marked for display after a predetermined time period. The tokens may be used by removing them from the stack and used tokens are replaced with new tokens. In various embodiments, the tokens may be stored in a stack for sequential access on a first in, first out basis. Alternatively, the tokens are stored in a stack for sequential access on a first in, last out basis.

In various embodiments, the consumer may be identified prior to generating the token.

In another aspect, the invention relates to a system for processing a transaction among a consumer, a merchant and a transaction-processing entity. In various embodiments the system includes a token server for (i) generating a token encrypted with data identifying a financial account of the consumer and trust data for the consumer, and (ii) communicating the token to a device of the consumer; a point-of-sale system for reading and decrypting the token upon presentation thereof by the consumer in connection with the transaction, the point-of-sale system being configured to authorize the transaction based on (i) successful decryption of the token and (ii) the trust level without communication with the transaction-processing entity; and a transaction-processing server configured to (i) receive, from the point-of-sale system subsequent to transaction authorization, a record of the transaction and authorization thereof, and (ii) cause completion of the authorized transaction by causing funds to be transferred from the consumer's financial account to the merchant. The point-of-sale system may be configured to authorize the transaction based at least in part on a time of generation of the token and a time of the reading. The token server may be configured to encrypt the token using private key cryptography.

In various embodiments, the token server may be configured to embed an expiration time in the generated token. Additionally, the token server may be configured to embed a creation time in the generated token. The token server may be configured to generate and communicate a series of tokens to the device. In various embodiments, the token server may be configured to verify the consumer's identity prior to token generation.

In another aspect, the invention pertains to a method of processing a transaction among a consumer, a merchant point-of-sale system and a transaction-processing entity. In representative embodiments, the method includes generating a token with a digital signature, encrypted using a private key, with data identifying a financial account of the consumer and trust data for the consumer; receiving and storing the token and the signature by a device of the consumer; reading the token and decrypting the signature, by the merchant system, upon presentation of the token by the consumer's device in connection with the transaction; authorizing, by the merchant system, the transaction based on (i) successful verification of the signature and (ii) the trust level without communication with the transaction-processing entity; subsequent to authorization of the transaction by the merchant system, communicating, by the merchant to the transaction-processing entity, a record of the transaction and authorization thereof; and following the communication from the merchant system to the transaction-processing entity, completing the authorized transaction by causing funds to be transferred from the consumer's financial account to the merchant.

In another aspect, the invention relates to a system for processing a transaction among a consumer, a merchant and a transaction-processing entity. In various embodiments the system includes a token server for (i) generating a token with a digital signature, encrypted using a private key, with data identifying a financial account of the consumer and trust data for the consumer, and (ii) communicating the token to a device of the consumer; a point-of-sale system for reading and decrypting the signature upon presentation of the token by the consumer in connection with the transaction, the point-of-sale system being configured to authorize the transaction based on (i) successful verification of the signature and (ii) the trust level without communication with the transaction-processing entity; and a transaction-processing server configured to (i) receive, from the point-of-sale system subsequent to transaction authorization, a record of the transaction and authorization thereof, and (ii) cause completion of the authorized transaction by causing funds to be transferred from the consumer's financial account to the merchant.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. In addition, the terms like "consumer equipment," "mobile station," "mobile," "communication device," "access terminal," "terminal," "handset," and similar terminology, refer to a wireless device (e.g., cellular phone, smart phone, computer, PDA, set-top box, Internet Protocol Television (IPTV), electronic gaming device, printer, and so forth) utilized by a consumer of a wireless communication service to receive or convey data, control, voice, video, sound, gaming, or substantially any datastream or signaling-stream. The foregoing terms are utilized interchangeably in the subject specification and related drawings. The terms "component," "system," "platform," "module," and the like refer broadly to a computer-related entity or an entity related to an operational machine with one or more specific functionalities. Such entities can be hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1:
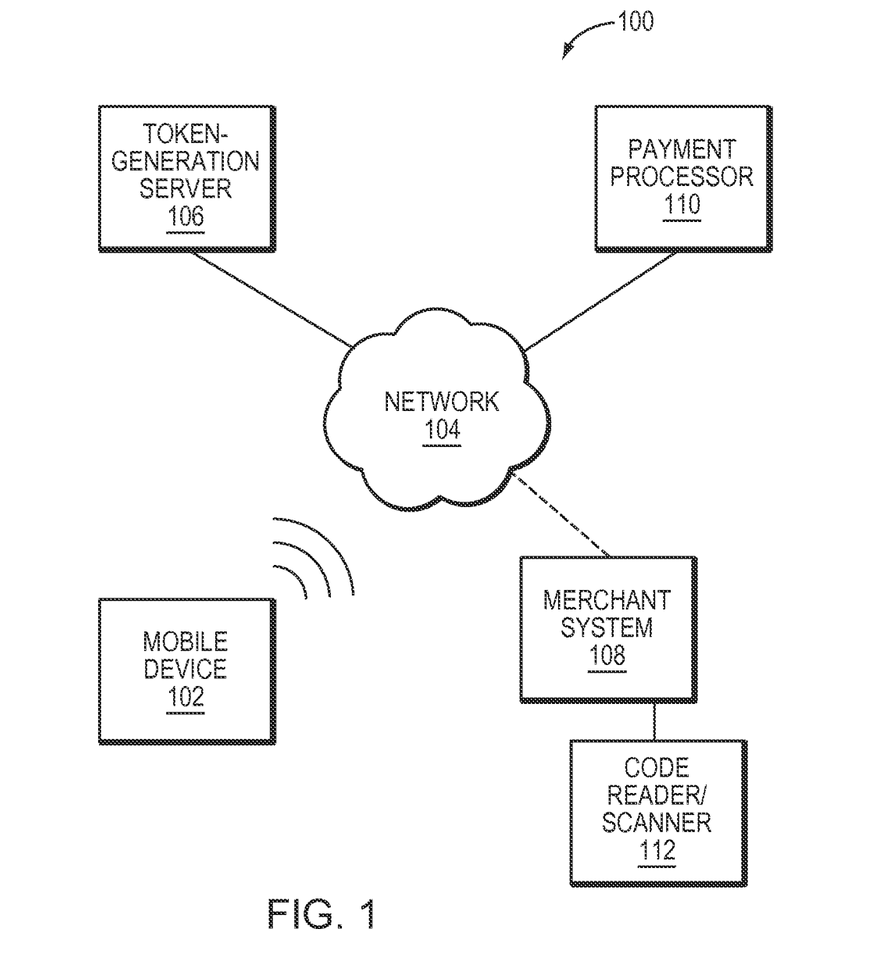
FIG. 1 is a block diagram of an exemplary network in accordance with an embodiment of the invention.

Refer first to FIG. 1, which depicts an exemplary mobile-payment transaction network 100 including a consumer device (e.g., a mobile device) 102 linked to a network 104 (e.g., a cellular telephone network, the Internet, or any wide-area network or combination of networks capable of supporting point-to-point data transfer and communication) that supports wired, wireless, or any two-way communication. The network 104 connects various devices, including a token-generation server 106, one or more merchant systems (e.g., POS terminals) 108, and a payment processor 110 utilizing, again, wired, wireless, or any two-way communications. The token-generation server 106 is responsible for generating encrypted, unique payment tokens associated with the consumer. Each merchant system 108 may be associated with a merchant who offers goods or services for sale to the consumer possessing the mobile device 102. In one embodiment, the merchant system 108 is a POS system (e.g., an electronic cash register) that connects to a code reader or scanner (hereafter "reader") 112. The reader 112 may be capable of reading and/or decoding a payment token, in the form of, for example, a barcode, a radio frequency identification (RFID) code, or a QR code, and/or receiving signals, such as NFC signals, acoustic signals, or infrared signals. In addition, the reader 112 may be mobile or physically associated with the merchant system 108. The merchant system 108 may be responsible for decrypting the decoded payment token information and authenticating the payment transaction based on information provided therein. The payment processor 110 may be responsible for actually performing the payment transaction and, in some cases, for decrypting the payment token. For example, a so-called "direct" payment processor represents the financial-processing backend provider to credit-card issuers and payment services such as PAYPAL. An "indirect" payment processor is an independent entity processing transactions for multiple payment services and maintains its own records and data. The payment processor 110 may also be configured to decrypt and authenticate the token as a second verification layer.

Figure 2A:
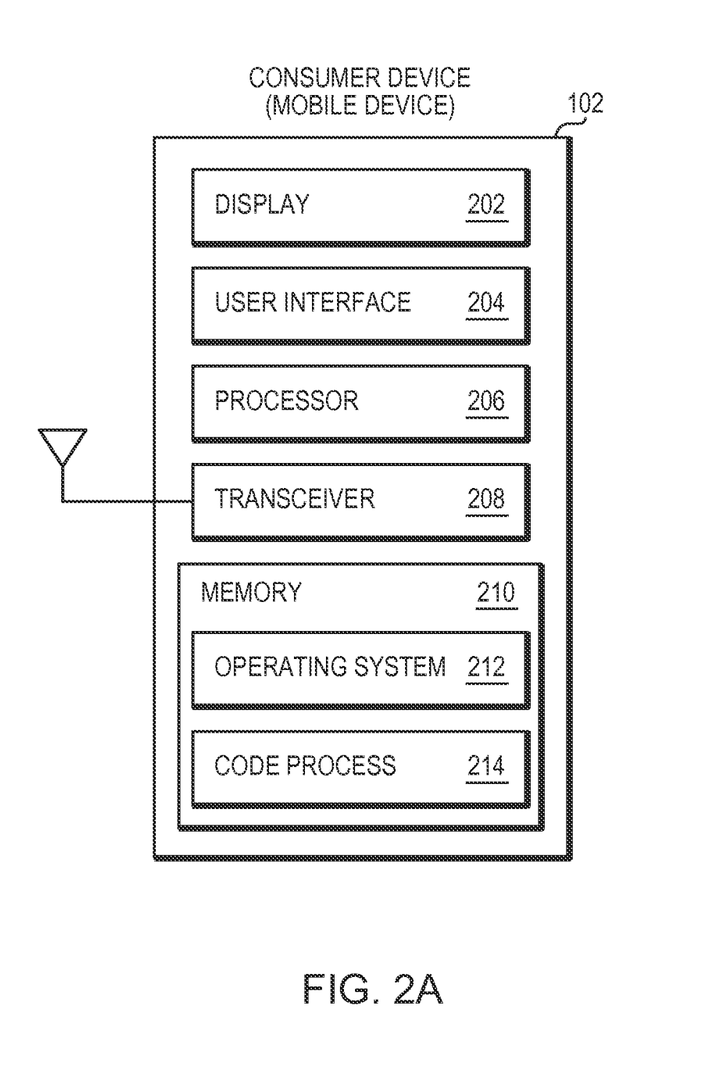
FIGS. 2A, 2B, and 2C are block diagrams of an exemplary consumer device, token-generation server, and merchant system, respectively, in accordance with an embodiment of the invention.

The mobile device 102 acts as a gateway for transmitting the consumer's data to the network 104. The mobile device 102 can support multiple communication channels for exchanging multimedia and other data with the server 106 and other devices using a Wi-Fi LAN (e.g., IEEE 802.11 standard) for Internet access, a short-range Bluetooth wireless connection for point-to-point access, and/or an NFC channel for close-proximity access. Referring to FIG. 2A, in various embodiments, the mobile device 102 includes a conventional display screen 202, a user interface 204, a processor 206, a transceiver 208, and a memory 210. The transceiver 208 may be a conventional component (e.g., a network interface or transceiver) designed to provide communications with a network, such as the Internet and/or any other land-based or wireless telecommunications network or system, and, through the network, with the token-generation server 106. The memory 210 includes an operating system (OS) 212, such as GOOGLE ANDROID, NOKIA SYMBIAN, BLACKBERRY RIM or MICROSOFT WINDOWS MOBILE, and a code process 214 that implements the device-side functions as further described below. Additional transactional information may be embedded in the code process 212 for transmission through the network 104 for later processing on a back-end server (e.g., the token-generation server 106). As used herein, the term "mobile device" used for transacting a mobile payment refers to a "smart phone" or tablet with advanced computing ability that, generally, facilitates bi-directional communication and data transfer using a mobile telecommunication network, and is capable of executing locally stored applications and/or payment transactions. Mobile devices include, for example, IPHONES (available from Apple Inc., Cupertino, Calif.), BLACKBERRY devices (available from Research in Motion, Waterloo, Ontario, Canada), or any smart phones equipped with the ANDROID platform (available from Google Inc., Mountain View, Calif.), tablets, such as the IPAD and KINDLE FIRE, and personal digital assistants (PDAs). The memory 210 may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit.

Figure 2B:
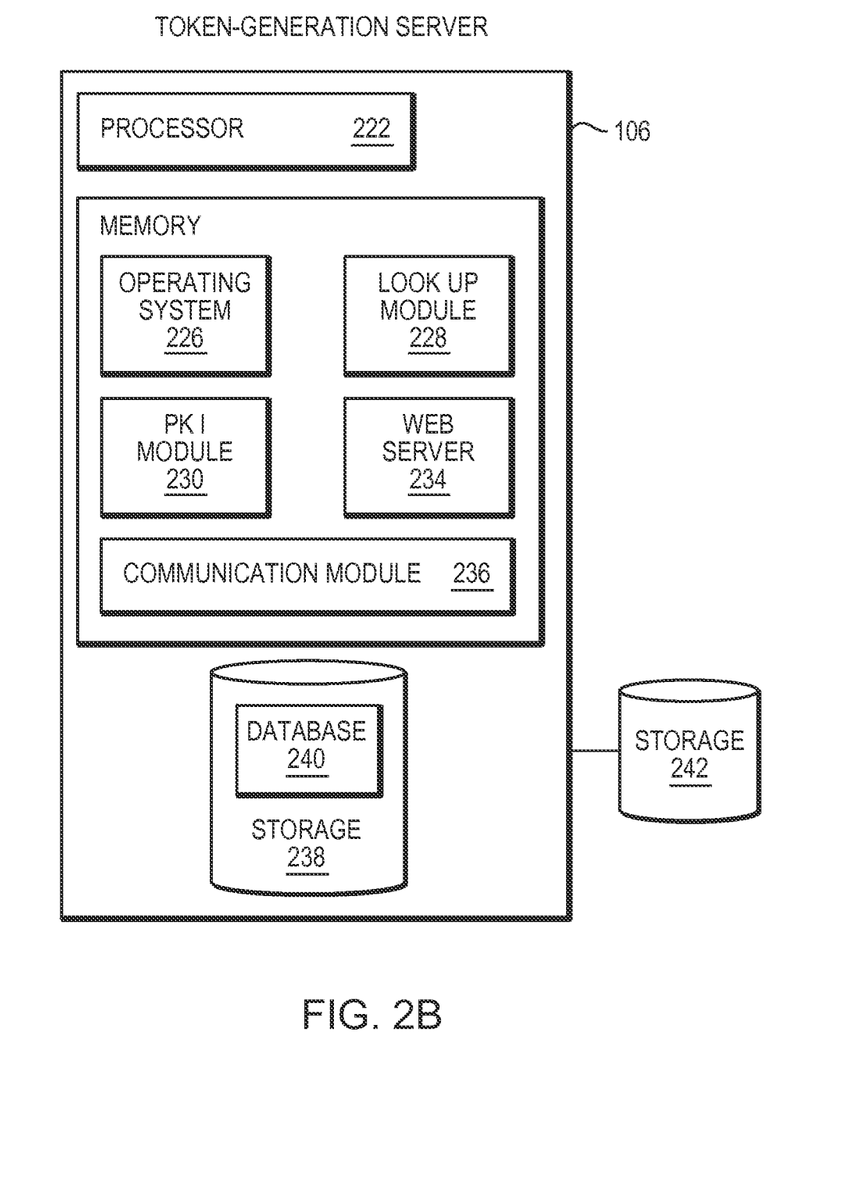

The token-generation server 106 is a trusted system that generates encrypted payment tokens. In response to requests made by a registered user via the consumer device 102, the server 106 generates tokens and transmits them to the consumer device 102 for presentation to complete a transaction. Referring to FIG. 2B, in various embodiments, the token-generation server 106 includes a processor 222 and a memory 224, which may include volatile and nonvolatile portions. The memory 224 contains instructions, conceptually illustrated as a group of modules, that control the operation of the processor 222 and its interaction with hardware components. An operating system 226 directs the execution of low-level, basic system functions such as memory allocation, file management and operation of mass storage devices. At a higher level, a look-up module 228, a PKI module 230, a web server block 234, and a communication module 236 perform the basis system functions described in greater detail below. The communication module 234 may be a conventional component (e.g., a network interface or transceiver) designed to provide communications with a network, such as the Internet and/or any other land-based or wireless telecommunications network or system, and, through the network, with the mobile device 102, the merchant system 108, and the payment processor 110. The web-server block 236 enables web-based communication with the mobile device 102, and can be a conventional web-server application executed by the processor 222.

A consumer database 240 may reside in a storage device 238 and/or an external mass-storage device 242 accessible to the token-generation server 106; the consumer database 240 stores, for example, a record associated with each registered consumer, or device, with associated trust data (e.g., transactional data). The database 240 is responsive to queries from lookup module 228.

In operation, the user operates an executable, interactive application (an "app") on the mobile device 102 identifies himself to the server 106, e.g., using a password or other strong form of authentication. The look-up module 228 obtains the user's account records from the database 240 and, using the PKI module 230, generates an encrypted token for that user using a private key. The encrypted token contains information to uniquely identify the token or the user of the token, as well as trust data from the user's database record. Trust data may also reflect the time the token was generated, since more recently created tokens are considered more trustworthy (since the likelihood of fraudulent access or use increases over time). In general, trust data reflects a probability that the payment processor 110 will ultimately authorize the desired payment on the user's behalf. For example, the trust data may specify how many transactions the consumer has processed in the past (in some embodiments, more recent transactions may receive a greater trust weight), the spending limit of the consumer, the home region of the consumer, the transaction history of the consumer (in some embodiments, transactions at merchants where the consumer has transacted previously may receive a greater trust weight), the age of the consumer's account (which may be correlated with the user's transaction history, but is a distinct piece of information which is much smaller to store), and other demographic information. Additional trust factors can include trust levels of other individuals with whom the user is somehow associated (e.g., social network "friends"), as well as trust levels associated with those individuals' friends and the number of funding sources the user has. For example, a user with only a single funding source may be a higher risk than a user with multiple funding sources (e.g., one credit card or bank account on file, versus many different accounts on file). This may also be based on the institutions in which the accounts are held, as it is less likely for a user to close accounts across different institutions simultaneously. In some embodiments, an aggregated "trust-factor" value is calculated that collapses all of these various metrics into a single value to be included in the token. The trust-factor value may be numeric or may simply be a coarse level, e.g., low, medium, or high.

Trust data may be updated when the registered user initiates or completes a new transaction, e.g., when the server 106 receives a record of a new transaction from the payment processor 110 via the communication module 234. In another embodiment, the trust data is updated periodically in a predetermined time period. For example, the trust data may be updated at a set time each day based on transactions that the user has completed within the previous 24 hours. The trust data may also be updated continuously based on patterns from all transactions processed, including transactions not involving the particular user. Similarly, the trust data may be updated continuously based on the trust factor of that person's social network "friends."

The server 106 transmits the generated token back to the mobile device 102 via the communication module 234. As is well understood in the art, the token, encrypted using the private key, may be decrypted using a public key; the latter is made available to merchant systems 108 to use in the course of transactions in accordance herewith. In one embodiment, the private key and associated public key (the private/public key pair) are reset periodically (e.g., in a predetermined period of time) for security purposes; the public key is communicated, via communication module 234, to the merchant system 108 upon every reset. In another embodiment, the private/public key pair is unchangeable. The token may be an authentication that is read directly by the merchant system 108 using, for example, NFC; may encode an optically readable "mature code" (e.g., a QR code or a bar code) that is displayed on the screen of the mobile device 102; or may be a "seed code" from which the mobile device 106 (via the app) can generate a mature code later.

Figure 2C:
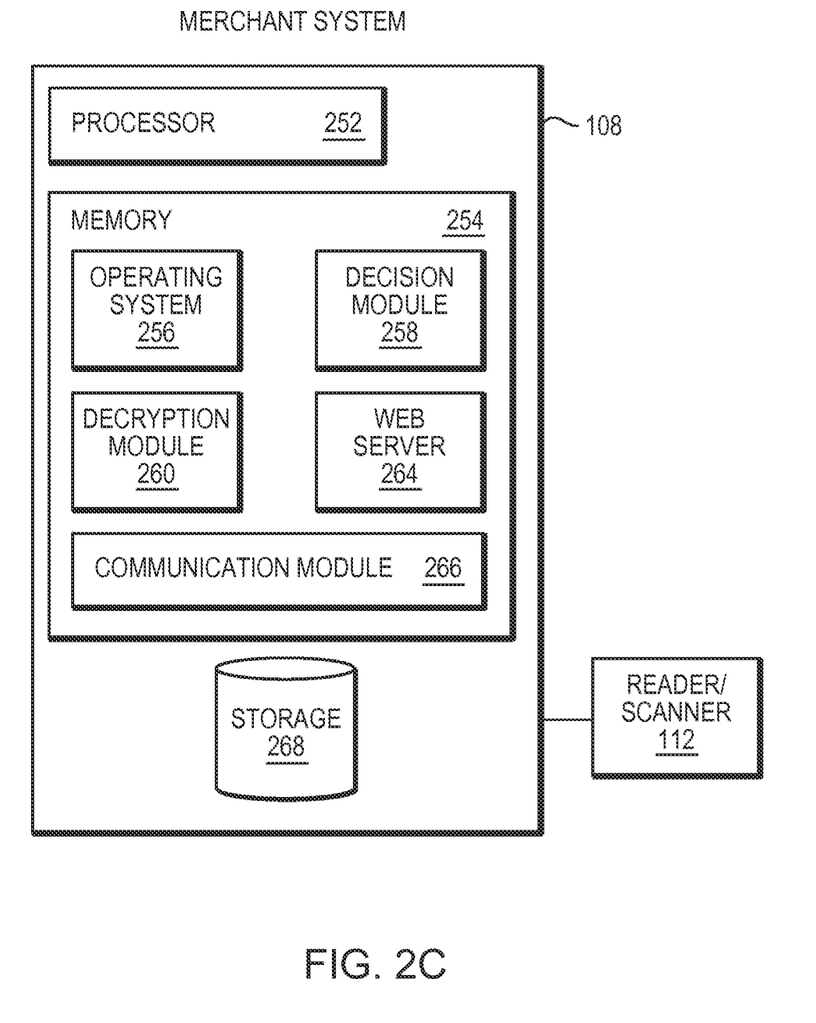

Referring to FIG. 2C, in various embodiments, the merchant system 108 includes a processor 252, a memory 254, an operating system 256, a decision module 258, a decryption module 260, a web server block 264, a communication module 266, and a storage device 268. As described above, the various functional modules are typically implemented as stored instructions that operate as running processes via the processor 252. The merchant system 108 may be connected to or include the reader 112, which is capable of reading payment tokens according to any suitable modality (optical, NFC, etc.) from a consumer's mobile device 102. The decryption module 260 stores the public key and decrypts the token obtained by the reader 112. If decryption is successful, the decision module 258 may, in some embodiments, further authenticate the token or the consumer if decryption is successful (e.g., by requesting a password or biometric indicium, such as a fingerprint, from the consumer). In instances where the merchant system 108 does not or presently cannot communicate with the payment processor 110, the decision module 258 decides, based on the decrypted trust data, whether to authorize the transaction as further described below. Accordingly, the merchant system 108 does not require continuous network access in order to authorize transactions. The transaction may be authorized based on the trust data and transactional information saved in storage device 268 for later transmission through the network 104 for processing on a back-end server (e.g., the payment processor 110).

Figure 3:
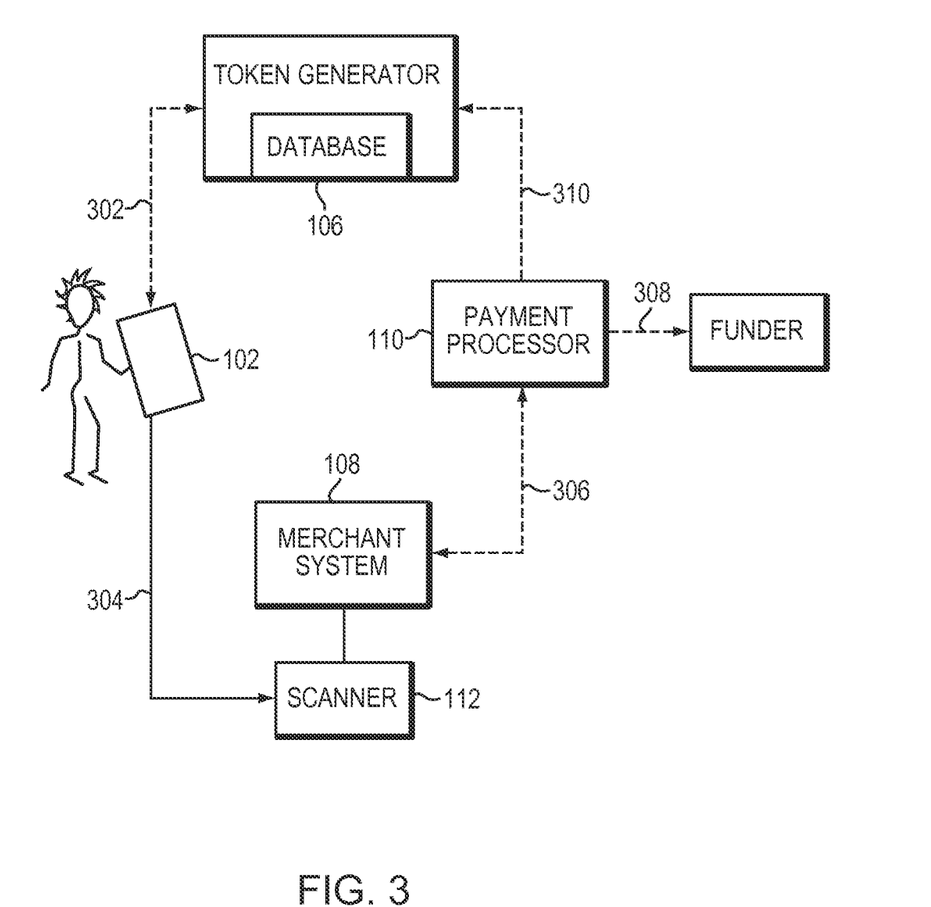
FIG. 3 depicts an exemplary system for performing secure payment transactions in accordance with an embodiment of the invention.

As illustrated in FIG. 3, payment transactions in accordance herewith may involve different stages that need not take place in tandem or at specific times, but instead may occur whenever a network connection can be established: a token-generation stage 302, a payment-initiation stage 304, a payment-authorization stage 306, a funds-transfer stage 308, and a database-update stage 310. For example, the payment initiation stage 304 does not require a network connection when the encrypted token is read from the mobile device 102 by a POS merchant system 108. The various stages are described in further detail below.

Figure 4A:
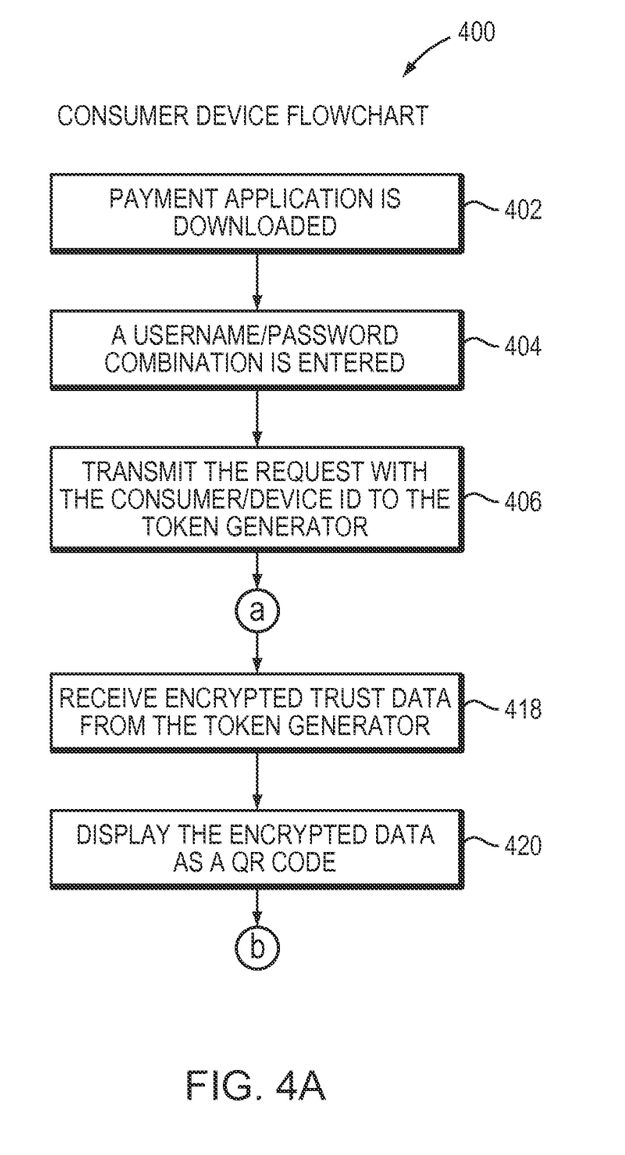
FIGS. 4A, 4B, and 4C are flowcharts illustrating performance of secure payment transactions in accordance with an embodiment of the invention.
Figure 4B:
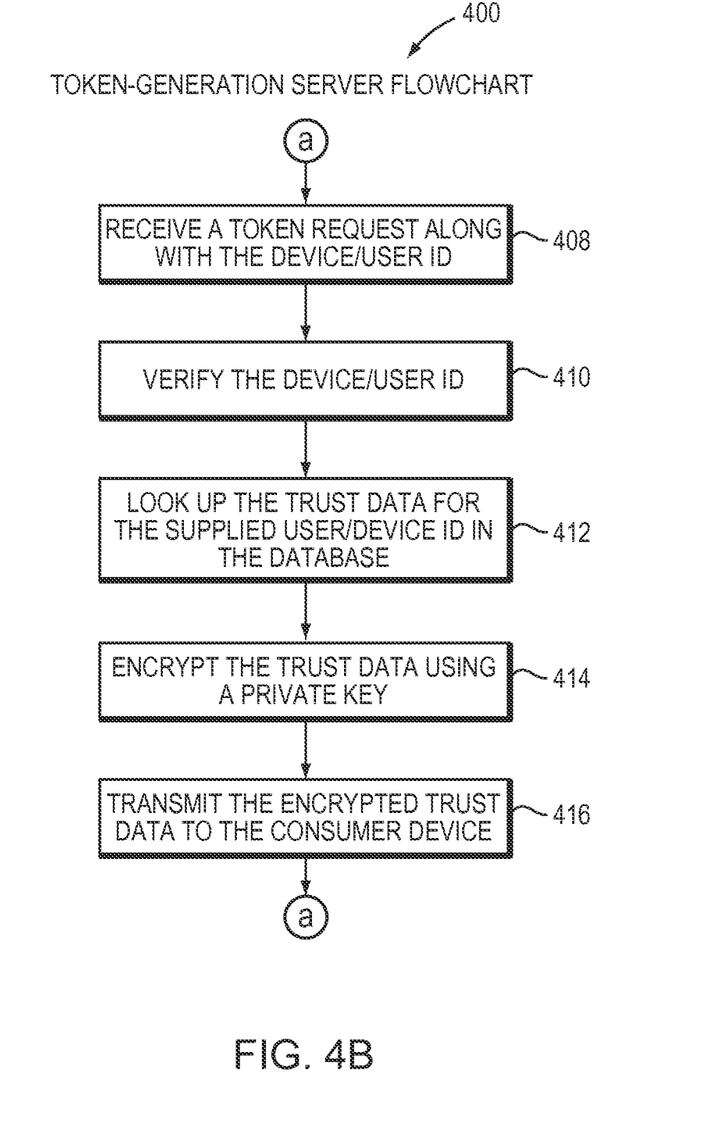
Figure 4C:
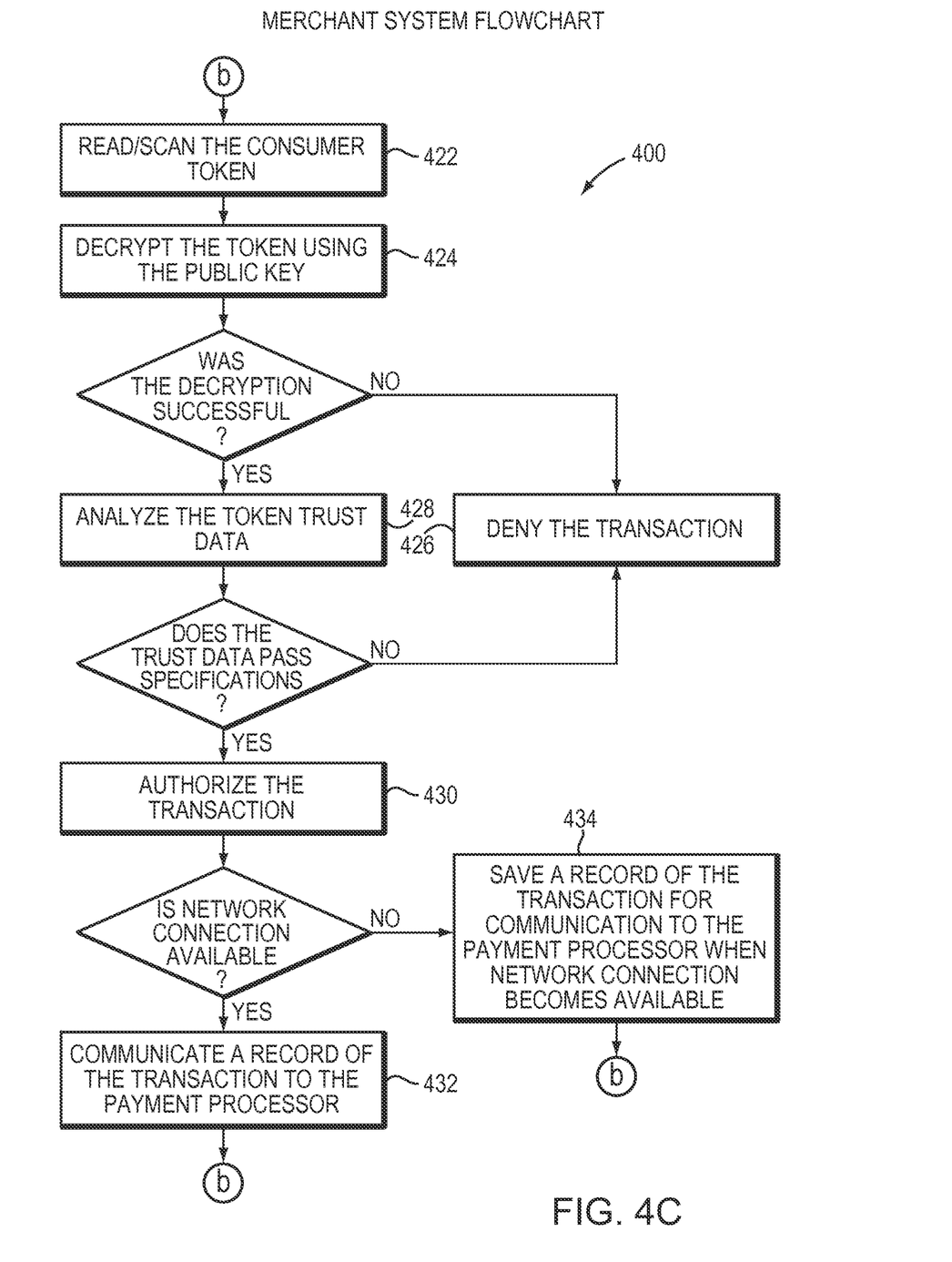

A representative method 400 for safely transacting a payment without continuous network access in accordance with embodiments of the current invention is shown in FIGS. 4A, 4B, and 4C (with additional reference to FIGS. 1 and 2A-2C). Assuming the consumer is registered with the token-generation server 106, the consumer, or an application acting on behalf of the consumer, can log in to the server 106 to retrieve a payment token. For example, the consumer may download an app onto her mobile device 102 (step 402); the app, when executed on the mobile device 102, communicates with the token-generation server 106 and allows the user to log in by supplying a proof of identify, such as a username/password pair (step 404) either to the app, which then transmits the log-in information to the server 106, or to the server 106 directly via, for example, a web session—and request a token. This request is transmitted to the token-generation server 106 (step 406). The identifying information is verified (step 408), once again either by the app or by the token-generation server 106, and the look-up module 228 of the token-generation server 106 looks up the consumer's account data stored in database 240 (step 410) and generates a token for the consumer. The token contains data that identifies the consumer and/or the token as well as trust data for the consumer. The token may contain actual financial account information of the consumer or may instead contain information (such as an email address, telephone number, or random unique data) that can be mapped to the consumer's account by the payment processor 110. Before being sent, the token is encrypted using the private key (step 414). The encrypted token is then transmitted to the mobile device 102 (step 416). Although the discussion herein focuses on a private/public key pair method of encryption for purposes of illustration, the present invention may be implemented using any asymmetric encryption method in which a secret key is known only to the token-generation server 106. In other embodiments, the private key may be used to digitally sign the token and successful verification of the signature proves the token's authenticity. Digital signatures utilize the public key infrastructure to ensure authenticity (i.e., that no one has tampered with the token in transit and that the token was indeed generated by the token-generation server 106.)

The client app running on the mobile device 102 receives and stores the encrypted token (step 418). The token-generation process may take place at any time after a consumer registers an account. The token may be delivered to the mobile device 102 at any time a network connection can be established. Generation of the token and delivery of the token may occur as two separate steps and may not happen at the same time. The device 102 need not be continuously connected to network 104 and sporadic connectivity is sufficient to gain the benefits of the present invention. In addition, to reduce the risk of tokens being stolen, the token can be rotated. For example, the client app may be configured to check for network connectivity after a period of time, corresponding to the desired lifetime of a token, has elapsed since the token was received. If network connectivity is unavailable, the client app periodically checks until it detects a network connection. The client app may poll for connectivity, or the app may asynchronously monitor for connectivity changes. For example, the operating system of the mobile device 102 may have facilities to notify apps asynchronously when network connectivity returns. The app may also be programmed wait for a triggering event before communicating with the server. For example, this triggering event may be in the form of the user opening the app, the user clicking a button to refresh his token, or other triggers as determined by the app's programming. If two-way communication between the app and the merchant system 108 is possible, the app may rotate the token after communicating the previous token to the merchant system 108. At this point, without the involvement of the consumer, the app causes the mobile device 102 to communicate with the token-generation server 106 to obtain a replacement token. In some embodiments, the app passively monitors for other network traffic on the device prior to communicating with the token-generation server 106 in order to optimize power consumption. When the new token is received, the app causes the old one to be invalidated (so that the consumer uses only the newest token in a transaction). Alternatively, the rotation of tokens may be initiated by the payment processor 110. The payment processor 110 may send a "push notification" message to the application, either periodically or after a triggering event. For example, the app may display a token but not know when that token has been successfully used to complete a transaction. When a transaction has been completed, the payment processor 110 may therefore send a push notification to the device to rotate the token. In accordance with this approach, the token may be contained in the push notification or, instead, the push notification may simply be a "tickle" to cause the mobile device 102 to initiate a request to obtain a new token. If the mobile device 102 is offline when the push notification is sent, delivery of the push notification may be queued for delivery once the mobile device 102 comes online again. The process of networked code rotation is far more secure than simple static tokens.

Alternatively, in response to a token request, the token-generation server 106 may generate and deliver an encrypted, ordered stack—or "quiver"—of tokens for secure storage in the mobile device 102. Whenever the consumer displays a token on the mobile device 102 (even if a payment transaction is not initiated), it is locally marked as displayed and the next token in the stack is marked for display. This process repeats each time a token is displayed. In some embodiments, each time a token is displayed, the app causes the mobile device 102 to attempt to establish a network connection and, when the connection is established, commands the token-generation server 106 to mark the current token (i.e., the one on display) code for invalidation after a short period of time (e.g., in 60 minutes) and to invalidate all tokens preceding it in the stack (in case some had been displayed without a network connection). In this way, the current token—which is assumed to have been displayed because a transaction is imminent—is invalidated within a reasonable time to prevent fraud, since a token is at particular risk for fraudulent acquisition and use when displayed. The token-generation server 106 may generate and transmit to the mobile device 102 enough new tokens to "refill" the quiver; the new tokens may be stored at the back end of the quiver so that older tokens are used on a first in, first out (FIFO) basis. FIFO operation ensures that the consumer always has newer tokens on hand. Alternatively, the new tokens may be stored at the front end of the quiver for last in, first out (LIFO) operation. While FIFO is preferred for extended periods of offline access, LIFO is generally better for security: newer tokens may have newer fraud information embedded in them, which benefits the payment network if they are used first. Since most devices tend to establish a network connection on each transaction, a reasonable quiver size is 30 tokens, which minimizes the likelihood of running out of tokens from the quiver. However, if all tokens in the quiver have been displayed without a network connection having been established, the last token is not marked as invalid and the mobile device 102 continues to display it. In some embodiments, each token in a quiver is given a sequence number (e.g., the first token is sequence 1, the last token is sequence 30). This sequence number may be embedded in the token itself, acting as a form of trust data. If the mobile device 102 goes a long period of time without connecting to the token-generation server 106, the last token in the quiver may be used for a long period of time. In various embodiments, the merchant system 108 is configured to reject the last token in a quiver when the mobile devices are operating in distributed mode and are not able to communicate with the payment processing system (e.g., the network is down). In various embodiments, each token in the quiver has a different validity period embedded in its trust data, and not all of the tokens in the quiver are valid simultaneously. This reduces the likelihood that any given token in the quiver can be stolen and used fraudulently.

A payment transaction is initiated when the consumer presents a token (e.g., in the form of a QR code) stored in the mobile device 102 to the merchant system 108 (step 420). The merchant system 108 may scan the code using the reader 112 (step 422), and thereupon decrypts the token using the public key (step 424). Any token that unsuccessfully decrypts is either fraudulent or corrupted, and the transaction is denied (step 426). Any token that successfully decrypts is guaranteed to have been created with private key, and is assumed to have come from the token-generation server 106. The merchant system 108 may then attempt to transmit the token along with information about the transaction (the amount to be paid, in particular) and the merchant's own identity to the payment processor 110, and await approval or denial. If a network connection cannot be established, however, the merchant system 108 can itself approve the transaction based on the trust data in the token using the decision module 258 (step 428). Although this does not guarantee that the payment processor 110 will ultimately authorize the transaction, if the token decrypts successfully and was generated within a certain amount of time, and the trust data is satisfactory, the risk may be acceptable to the merchant.

The criteria applied in evaluating the trust data may be universal across the system 100 or may be specific to particular merchant systems 108. For example, a merchant may choose only to accept tokens from consumers whose home region is within a set distance of the POS; tokens from consumers who have transacted with the merchant previously; tokens that have been generated within a set time period; and/or trust data reflecting a transaction history success rate above a threshold percentage or number. In the latter case, the transaction history may be weighted in favor of more recent transactions in determining whether the threshold acceptability level is reached. The threshold acceptability level may vary with the amount of the transaction, and different criteria may receive different weights that themselves vary with the transaction amount. The trust criteria may be selected and combined in accordance with the priorities and preferences of the merchant and programmed into the decision module 258, which scores each transaction accordingly. It should be emphasized that trust criteria can include any factors relevant to a risk score, e.g., the location of the merchant scored against local aggregated crime statistics from public databases.

If the criteria are satisfied, the merchant system 108 authorizes the transaction (step 430) and communicates the authorization along with the encrypted token and information about the transaction and the merchant's own identity to the payment processor 110 when a network connection is available (step 432); assuming the consumer's financial account is in good standing, the payment processor 110 will transfer funds to the merchant. Until a network connection can be established, the token and transaction information are saved to the local storage 268 in the merchant system 108 for transmission when network connectivity is available (step 434).

A middle ground can be established between autonomous approval by the merchant system 108 and connectivity to the payment processor 110. In some embodiments, an "agent" of the payment processor 110—i.e., a program supplied by the payment processor 110 and executing as a running process on the merchant system 108—provides the approval based on the trust data and the token. In other words, the approval criteria are supplied by the payment processor, not the merchant, so that upon transaction approval by the agent, the merchant is guaranteed to receive payment from the payment processor 110. Particularly if the agent is supplied as an executable file, the criteria utilized by the payment processor 110 may be proprietary—i.e., hidden from merchants or other users of the executable file. Following approval, the agent causes transaction data to be stored locally and sent to the payment processor 110 when network connectivity is available. The agent may be supplied to the merchant as a secure (hidden) executable file or, in some embodiments, as a separate physical component (e.g., a dongle) with security features that prevent unauthorized access and tampering. In other embodiments, the agent may be a proxy for a payment processor that sits within the merchant's network. For example, consider a large merchant or a grocery store chain where each transaction may go through an internal network of the merchant, which connects to the internal payment processor. In some embodiments, the payment may be sent to an "agent" which is a separate server (or software on an existing server owned by the merchant), which handles the communication with the actual payment processor 110. If the actual payment processor 110 is unavailable, this agent may act on behalf of the payment processor 110 to approve the transaction based on the encrypted information included in the payment token. This agent would the store the transaction and forward it once the payment processor 110 becomes available again. While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. For example, each of the processors described herein may be a general-purpose computer, but alternatively may be a CSIC (consumer-specific integrated circuit), ASIC (application-specific integrated circuit), a logic circuit, a digital signal processor, a programmable logic device, such as an FPGA (field-programmable gate array), PLD (programmable logic device), PLA (programmable logic array), RFID processor, smart chip, or any other device or arrangement of devices that is capable of implementing the steps of the processes of the invention.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The various modules and apps described herein can include machine instructions for a programmable processor, and can be implemented in a high-level procedural and/or object-oriented programming language, and/or in assembly/ machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of processing a transaction among a consumer, a merchant point-of-sale system, and a transaction-processing entity, the method comprising:
    calculating, by a token server, a trust-factor value for the consumer based on a plurality of trust factors, including first trust levels of other users who are connected to the consumer through one or more social networks together with second trust levels associated with one or more friends connected to the other users and number of funding sources corresponding to the consumer;
    generating, by the token server, a token encrypted with data identifying a financial account of the consumer and trust data for the consumer, the trust data including the trust-factor value including the first trust levels of the other users and the second trust levels associated with the one or more friends connected to the other users;
    receiving, from the token server, and storing by a device of the consumer, the token encrypted with data identifying the financial account of the consumer and trust data for the consumer, the trust data including the trust-factor value;

reading and decrypting, by the merchant point-of-sale system, the token upon presentation thereof by the device of the consumer in connection with the transaction, including scanning the token presented by the device by a scanner at the merchant point-of-sale system;

authorizing, by the merchant point-of-sale system, the transaction based on (i) successful decryption of the token and (ii) the trust level without communication with the transaction-processing entity;

subsequent to authorization of the transaction by the merchant point-of-sale system, communicating, by the merchant point-of-sale system to the transaction-processing entity, a record of the transaction and authorization thereof;

following the communication from the merchant point-of-sale system to the transaction-processing entity, completing the authorized transaction by causing funds to be transferred from the consumer's financial account to a merchant associated with the merchant point-of-sale system; and updating the trust data for the consumer based on patterns from other transactions of the other users who are connected to the consumer including transactions not involving the consumer, and updates of the first trust levels of the other users who are connected to the consumer through the one or more social networks.

2. The method of claim 1, wherein the authorized transaction is completed upon approval by the transaction-processing entity of a basis for the authorization by the merchant point-of-sale system.

3. The method of claim 1, wherein approval by the merchant point-of-sale system is also based on a time of generation of the token and a time of the reading.

4. The method of claim 1, wherein the trust data further contains at least one of (i) a token generation time, (ii) a transaction history of the consumer, (iii) a spending limit of the consumer, or (iv) a home region of the consumer.

5. The method of claim 1, wherein the trust data is a single trust-factor value.

6. The method of claim 1, wherein the token is encrypted using public key cryptography.

7. The method of claim 1, wherein the token is displayed as a QR code on the device of the consumer.

8. The method of claim 1, wherein the token is a one-time-use token.

9. The method of claim 1, further comprising generating and storing, on the device of the consumer, a plurality of tokens.

10. The method of claim 9, wherein following presentation of a first token, the first token is marked for deletion and a second token is marked for display on a subsequent presentation.

11. The method of claim 10, wherein presentation of the first token comprises receiving confirmation from the merchant point-of-sale system that the token was received.

12. The method of claim 10, wherein the token is not marked for deletion until a deletion communication is received from the transaction-processing entity.

13. The method of claim 9, wherein following presentation of a first token, the first token is marked for deletion and a second token is marked for display after a predetermined time period.

14. The method of claim 1, further comprising marking the token for deletion and generating the token to replace the token marked for deletion.

15. The method of claim 1, wherein the tokens are stored in a stack for sequential access on a first in, first out basis.

16. The method of claim 1, further comprising identifying the consumer prior to generating the token.

17. A system for processing a transaction among a consumer, a merchant point-of-sale system, and a transaction-processing entity, the system comprising:

a token server comprising a first processor executing instructions stored in a first memory of the token server, the first processor configured for (i) calculating a trust-factor value for the consumer based on a plurality of trust factors, including first trust levels of other users connected to the consumer through one or more social networks together with second trust levels associated with one or more friends connected to the other users and number of funding sources corresponding to the consumer, (ii) generating a token encrypted with data identifying a financial account of the consumer and trust data for the consumer, the trust data including the trust-factor value including the first trust levels of the other users and the second trust levels associated with the one or more friends connected to the other users, and (iii) communicating the token to a device of the consumer;

a merchant point-of-sale system comprising a second processor executing instructions stored in a second memory of the merchant point-of-sale system, the second processor configured for reading and decrypting the token upon presentation thereof by the consumer in connection with the transaction, including scanning the token presented by the device by a scanner at the merchant point-of-sale system, the merchant point-of-sale system being configured to authorize the transaction based on (i) successful decryption of the token and (ii) the trust level without communication with the transaction-processing entity; and a transaction-processing server comprising a third processor executing instructions stored in a third memory of the transaction-processing, the processor configured to (i) receive, from the merchant point-of-sale system subsequent to transaction authorization, a record of the transaction and authorization thereof, and (ii) cause completion of the authorized transaction by causing funds to be transferred from the consumer's financial account to a merchant associated with the merchant point-of-sale system, updating the trust data for the consumer based on patterns from other transactions of the other users who are connected to the consumer including transactions not involving the consumer, and updates of the first trust levels of the other users who are connected to the consumer through the one or more social networks.

18. The system of claim 17, wherein the merchant point-of-sale system is configured to authorize the transaction based at least in part on a time of generation of the token and a time of the reading.

19. The system of claim 17, wherein the token server is configured to encrypt the token using private key cryptography.

20. The system of claim 17, wherein the token server is configured to embed an expiration time in the generated token.

21. The system of claim 17, wherein the token server is configured to embed a creation time in the generated token.

22. The system of claim 17, wherein the token server is configured to generate and communicate a series of tokens to the device.

23. The system of claim 17, wherein the token server is configured to verify the consumer's identity prior to token generation.

24. A method of processing a transaction among a consumer, a merchant point-of-sale system, and a transaction-processing entity, the method comprising:
- calculating, by a token server, a trust-factor value for the consumer based on a plurality of trust factors, including first trust levels of other users connected to the consumer through one or more social networks together with second trust levels associated with one or more friends connected to the other users and number of funding sources corresponding to the consumer;
- generating, by the token server, a token with a digital signature, encrypted using a private key, with data identifying a financial account of the consumer and trust data for the consumer, the trust data including the trust-factor value including the first trust levels of the other users and the second trust levels associated with the one or more friends connected to the other users;
- receiving, from the token server, and storing by a device of the computer, the token and the signature encrypted with data identifying the financial account of the consumer and trust data for the consumer, the trust data including the trust-factor value;
- reading the token and decrypting the signature, by the merchant point-of-sale system, upon presentation of the token by the device of the consumer in connection with the transaction, including scanning the token presented by the device by a scanner at the merchant point-of-sale system;
- authorizing, by the merchant point-of-sale system, the transaction based on (i) successful verification of the signature and (ii) the trust level without communication with the transaction-processing entity;
- subsequent to authorization of the transaction by the merchant point-of-sale system, communicating, by the merchant point-of-sale system to the transaction-processing entity, a record of the transaction and authorization thereof;
- following the communication from the merchant point-of-sale system to the transaction-processing entity, completing the authorized transaction by causing funds to be transferred from the consumer's financial account to a merchant associated with the merchant point-of-sale system,
- updating the trust data for the consumer based on patterns from other transactions of the other users who are connected to the consumer including transactions not involving the consumer, and updates of the first trust levels of the other users who are connected to the consumer through the one or more networks.

25. A system for processing a transaction among a consumer, a merchant point-of-sale system, and a transaction-processing entity, the system comprising:
- a token server comprising a first processor executing instructions stored in a first memory of the token server, the first processor configured for (i) calculating a trust-factor value for the consumer based on a plurality of trust factors, including trust levels of other users connected to the consumer through one or more social networks together with second trust levels associated with one or more friends connected to the other users and number of funding sources corresponding to the consumer, (ii) generating a token with a digital signature, encrypted using a private key, with data identifying a financial account of the consumer and trust data for the consumer, the trust data including the trust-factor value including the first trust levels of the other users and the second trust levels associated with the one or more friends connected to the other users, and (iii) communicating the token to a device of the consumer;
- a merchant point-of-sale system comprising a second processor executing instructions stored in a second memory of the merchant point-of-sale system, the second processor configured for reading and decrypting the signature upon presentation of the token by the consumer in connection with the transaction, including scanning the token presented by the device by a scanner at the merchant point-of-sale system, the merchant point-of-sale system being configured to authorize the transaction based on (i) successful verification of the signature and (ii) the trust level without communication with the transaction-processing entity; and
- a transaction-processing server comprising a third processor executing instructions stored in a third memory of the transaction-processing, the processor configured to (i) receive, from the merchant point-of-sale system subsequent to transaction authorization, a record of the transaction and authorization thereof, and (ii) cause completion of the authorized transaction by causing funds to be transferred from the consumer's financial account to merchant associated with the merchant point-of-sale system,
- wherein the token server further updates the trust data for the consumer based on patterns from other transactions of the other users who are connected to the consumer including transactions not involving the consumer, and updates of the first trust levels of the other users who are connected to the consumer through the one or more networks.

* * * * *